United States Patent
Gubbels et al.

(10) Patent No.: US 10,308,838 B2
(45) Date of Patent: Jun. 4, 2019

(54) MOISTURE CURABLE COMPOSITIONS

(71) Applicant: Dow Corning Corporation, Midland, MI (US)

(72) Inventors: Frederic Gubbels, Houtain-le-val (BE); David M. Hagan, Birch Run, MI (US); Angela L. Stringer, Port Saint Lucie, FL (US)

(73) Assignee: Dow Silicones Corporation, Midland, MI (US)

( * ) Notice: Subject to any disclaimer, the term of this patent is extended or adjusted under 35 U.S.C. 154(b) by 391 days.

(21) Appl. No.: 15/107,181

(22) PCT Filed: Dec. 22, 2014

(86) PCT No.: PCT/US2014/071804
§ 371 (c)(1),
(2) Date: Jun. 22, 2016

(87) PCT Pub. No.: WO2015/100198
PCT Pub. Date: Jul. 2, 2015

(65) Prior Publication Data
US 2016/0340548 A1    Nov. 24, 2016

Related U.S. Application Data

(60) Provisional application No. 61/919,924, filed on Dec. 23, 2013.

(51) Int. Cl.
| | |
|---|---|
| *C09D 183/06* | (2006.01) |
| *C08G 77/08* | (2006.01) |
| *C09J 183/06* | (2006.01) |
| *C08L 83/06* | (2006.01) |
| *C09J 5/00* | (2006.01) |
| *C08G 77/14* | (2006.01) |

(52) U.S. Cl.
CPC .......... *C09D 183/06* (2013.01); *C08G 77/08* (2013.01); *C08L 83/06* (2013.01); *C09J 5/00* (2013.01); *C09J 183/06* (2013.01); *C08G 77/14* (2013.01); *C08L 2205/025* (2013.01)

(58) Field of Classification Search
CPC ....... C09D 183/06; C08G 77/08; C08L 83/06; C09J 183/06
See application file for complete search history.

(56) References Cited

U.S. PATENT DOCUMENTS

| | | | |
|---|---|---|---|
| 2010/0099793 A1 | 4/2010 | Wunder | |
| 2011/0118406 A1 | 5/2011 | Mowrer et al. | |
| 2011/0178220 A1 | 7/2011 | Davio et al. | |
| 2012/0328888 A1* | 12/2012 | Kinzelmann | C08G 18/0852 428/458 |

FOREIGN PATENT DOCUMENTS

| | | | | |
|---|---|---|---|---|
| EP | 0206301 A2 | 12/1986 | | |
| EP | 0802233 A2 | 10/1997 | | |
| EP | 2106418 A1 | 10/2009 | | |
| GB | 2424898 A | 11/2006 | | |
| JP | S6211769 A | 1/1987 | | |
| JP | 2011510103 A | 3/2011 | | |
| JP | 2013129772 A | 7/2013 | | |
| JP | 2013227560 A | 11/2013 | | |
| WO | WO-2013101751 A1 * | 7/2013 | ............. | C08L 83/04 |
| WO | WO2013101751 A1 | 7/2013 | | |
| WO | WO2013165552 A2 | 11/2013 | | |
| WO | WO2013090127 A1 | 6/2016 | | |

OTHER PUBLICATIONS

PCT/US2014/071804 International Search Report dated Feb. 10, 2015, 4 pages.
English language abstract and machine assisted translation for JP2013129772 (A) extracted from worldwide.espacenet.com database on Oct. 4, 2018,16 pages.
English language abstract and English language machine assisted translation for JP2013227560 (A) extracted from patents.google.com database on Oct. 4, 2018, 19 pages.

* cited by examiner

*Primary Examiner* — Daniel McNally
(74) *Attorney, Agent, or Firm* — Warner Norcross & Judd LLP

(57) ABSTRACT

A moisture curable composition comprises: (A) a polymer containing reactive hydroxyl or hydrolysable groups bonded to silicon which groups are reactive in the presence of moisture; (B) a crosslinking agent comprising at least two groups reactive with the silicon-bonded hydroxyl or hydrolysable groups of polymer (A); (C) one or more reinforcing and/or non-reinforcing fillers; and (D) a silane having the structure $(R^1)_m(Y^1)_{3-m}Si-Z^1-G^1-Z^2-Si(R^2)_q(Y^2)_{3-q}$. $R^1$ and $R^2$ are alkoxy groups containing from 1 to 6 carbons, $Y^1$ and $Y^2$ are alkyl groups containing from 1 to 8 carbons, $Z^1$ and $Z^2$ are alkylene groups having from 1 to 12 carbons, $G^1$ is a chemical group containing a heteroatom with a lone pair of electrons, and m and q are independently 1, 2 or 3. Silane (D) is present in an amount of from 15 to 30% by weight of the composition and functions as a cure catalyst.

20 Claims, No Drawings

MOISTURE CURABLE COMPOSITIONS

CROSS-REFERENCE TO RELATED APPLICATIONS

This application is the National Stage of International Application No. PCT/US2014/071804 filed on 22 Dec. 2014, which claims priority to and all advantages of U.S. Application No. 61/919,924 filed on 23 Dec. 2013, the content of which is hereby incorporated by reference.

This relates to moisture curable compositions cured by the reaction of hydroxyl or hydrolysable groups bonded to silicon. Such compositions, generally comprising a polymer containing reactive hydroxyl or hydrolysable groups bonded to silicon and a crosslinking agent containing groups reactive with the reactive groups of the polymer in the presence of moisture, are used for example as ambient temperature curable sealants or coatings. These compositions are typically either prepared in the form of one-part compositions curable upon exposure to atmospheric moisture at room temperature or multiple (typically two) part compositions curable upon mixing at room temperature.

In use as a sealant, it is important that the composition has a blend of properties which render it capable of being applied as a paste to a joint between substrate surfaces where it can be worked, prior to curing, to provide a smooth surfaced mass which will remain in its allotted position until it has cured into an elastomeric body adherent to the adjacent substrate surfaces. Typically sealant compositions are designed to cure quickly enough to provide a sound seal within several hours but at a speed enabling the applied material to be tooled into a desired configuration shortly after application.

The moisture curable compositions generally contain an organometallic compound as a catalyst for the reaction of the reactive groups of the polymer with the crosslinking agent. Although these groups react in the presence of moisture without a catalyst, an organometallic compound catalyst is generally required to promote cure of the composition, especially surface cure, in an acceptably short time. These organometallic compounds can be problematic for human health and the environment. Tin compounds, particularly diorganotin compounds such as dibutyltin dilaurate and dibutyltin diacetate, have been the most widely used catalysts for curing these moisture curable compositions, but there are now concerns about their continued use on health and environmental grounds.

This is particularly of concern in relation to multi-part, usually two part, condensation cure sealants which have been used in the Construction Industry for many years and are designed to cure very quickly when compared to one part sealant compositions. Set up time (cross-linking time) in insulated glass and structural glazing using a two-part sealant composition is typically between 4-24 hours as opposed to 7-21 days which would be expected when curing a 1-part composition. Two-part sealant compositions usually use these tin based catalysts in order to generate the fast cure.

It has now been found that certain silanes may function as a cure catalyst avoiding or minimising the need for traditionally used condensation cure catalysts.

There is provided herein a moisture curable composition comprising
(A) a polymer containing reactive hydroxyl or hydrolysable groups bonded to silicon which groups are reactive in the presence of moisture,
(B) a crosslinking agent comprising at least two and preferably at least three groups reactive with the silicon-bonded hydroxyl or hydrolysable groups of polymer (A),
(C) one or more reinforcing and/or non-reinforcing fillers,
(D) 15 to 30% by weight of the composition of a silane having the structure:

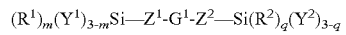

In which:
$R^1$ and $R^2$ are alkoxy groups containing from 1 to 6 carbons
$Y^1$ and $Y^2$ are alkyl groups containing from 1 to 8 carbons
$Z^1$ and $Z^2$ are alkylene groups having from 1 to 12 carbons
$G^1$ is a chemical group containing a heteroatom with a lone pair of electron; and
m and q are independently 1, 2 or 3,
characterised in that, silane (D) is provided to function as the cure catalyst.

No organometallic compound type catalyst, e.g. tin based catalyst is required for compositions as herein described to cure.

In a two part composition in accordance with the above there is provided a polymer base comprising components (A) and (C) and a cure package comprising components (B) and (D) in amounts such that when combined the composition will comprise from 1 to 15 parts by weight of polymer base per 1 part by weight of the cure package.

In one embodiment of the present invention the polymer (A) is a polysiloxane containing polymer containing at least two hydroxyl or hydrolysable groups, preferably terminal hydroxyl or hydrolysable groups. The polymer can for example have the general formula:

$$X^1\text{-}A'\text{-}X^2 \quad (1)$$

where $X^1$ and $X^2$ are independently selected from silicon containing groups which contain hydroxyl or hydrolysable substituents and A' represents a polymer chain. Examples of $X^1$ or $X^2$ groups incorporating hydroxyl and/or hydrolysable substituents include groups terminating as described below: $-Si(OH)_3$, $-(R^a)Si(OH)_2$, $-(R^a)_2SiOH$, $-(R^a)Si(OR^b)_2$, $-Si(OR^b)_3$, $-(R^a)_2SiOR^b$ or $-(R^a)_2Si-R^c-SiR^d_p(OR^b)_{3-p}$ where each $R^a$ independently represents a monovalent hydrocarbyl group, for example, an alkyl group, in particular having from 1 to 8 carbon atoms, (and is preferably methyl); each $R^b$ and $R^d$ group is independently an alkyl or alkoxy group in which the alkyl groups suitably have up to 6 carbon atoms; $R^c$ is a divalent hydrocarbon group which contains between 1 and 10 carbon atoms which may be interrupted by one or more siloxane spacers having up to six silicon atoms; and p has the value 0, 1 or 2.

The polymer chain A' can for example be a siloxane-containing polymer chain such as an organopolysiloxane or a siloxane/organic block copolymeric molecular chain. Hydroxy-terminated organopolysiloxanes, particularly polydiorganosiloxanes, are widely used in sealants and are suitable for use in the present invention. Thus the polymer (A) preferably includes siloxane units of formula (2):

in which each $R^5$ is independently an organic group such as a hydrocarbon group having from 1 to 18 carbon atoms, a substituted hydrocarbon group having from 1 to 18 carbon atoms or a hydrocarbonoxy group having up to 18 carbon atoms and s has, on average, a value of from 1 to 3, preferably 1.8 to 2.2. In a substituted hydrocarbon group, one or more hydrogen atoms in the group have been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Preferably each $R^5$ is a hydrocarbyl group having from 1 to 10 carbon atoms optionally substituted with one or more halogen group such as chlorine or fluorine and s is 0, 1 or 2. Particular examples of groups $R^5$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Suitably, at least some and preferably substantially all of the groups $R^5$ are methyl.

The polymer (A), particularly if it is a polydiorganosiloxane, may have a viscosity of up to 1,000,000 mPa·s at 25° C. All viscosity values provided are measured using a Brookfield® viscometer using a DV-2 THB RV/MA/HB-3 spindle and all viscosity measurements were taken at 25° C. unless otherwise indicated.

Polydiorganosiloxanes comprising units of the formula (2) may be homopolymers or copolymers in either block form or in a random continuation. Mixtures of different polydiorganosiloxanes are also suitable. In the case of polydiorganosiloxane co-polymers the polymeric chain may comprise a combination of blocks made from chains of units depicted in figure (2) above with s=2, where the two $R^5$ groups are:

both alkyl groups (preferably both methyl or ethyl), or
alkyl and phenyl groups, or
alkyl and fluoropropyl, or
alkyl and vinyl or
alkyl and hydrogen groups.

Typically at least one block will comprise siloxane units in which both $R^5$ groups are alkyl groups.

The polymer (A) may alternatively have a block copolymeric backbone comprising at least one block of siloxane groups of the type depicted in formula (2) above and at least one block comprising any suitable organic polymer chain. The organic polymer backbone may comprise, for example, polyoxyalkylene, polystyrene and/or substituted polystyrenes such as poly($\alpha$-methylstyrene), poly(vinylmethylstyrene), dienes, poly(p-trimethylsilylstyrene) and poly(p-trimethylsilyl-$\alpha$-methylstyrene). Other organic components which may be incorporated in the polymeric backbone may include acetylene terminated oligophenylenes, vinylbenzyl terminated aromatic polysulphones oligomers, aromatic polyesters, aromatic polyester based monomers, polyalkylenes, polyurethanes, aliphatic polyesters, aliphatic polyamides and aromatic polyamides.

The most preferred organic polymer blocks in a siloxane organic block copolymer (A) are polyoxyalkylene based blocks comprising recurring oxyalkylene units, illustrated by the average formula ($-C_nH_{2n}-O-$)$_y$ wherein n is an integer from 2 to 4 inclusive and y is an integer of at least four. The number average molecular weight of each polyoxyalkylene polymer block may range from about 300 to about 10,000. Moreover, the oxyalkylene units are not necessarily identical throughout the polyoxyalkylene block, but can differ from unit to unit. A polyoxyalkylene block, for example, can comprise oxyethylene units ($-C_2H_4-O-$), oxypropylene units ($-C_3H_6-O-$) or oxybutylene units ($-C_4H_8-O-$), or mixtures thereof. Preferably the polyoxyalkylene polymeric backbone consists essentially of oxyethylene units or oxypropylene units. Other polyoxyalkylene blocks may include for example: units of the structure—

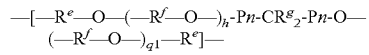

in which Pn is a 1,4-phenylene group, each $R^e$ is the same or different and is a divalent hydrocarbon group having 2 to 8 carbon atoms, each $R^f$ is the same or different and is an ethylene group or propylene group, each $R^g$ is the same or different and is a hydrogen atom or methyl group and each of the subscripts h and q1 is a positive integer in the range from 3 to 30.

The polymer (A) can alternatively be an organic polymer containing reactive hydroxyl or hydrolysable groups bonded to silicon. By an organic polymer we mean a material based on carbon chemistry, which is a polymer in which at least half the atoms in the polymer backbone are carbon atoms. The organic polymer is preferably a telechelic polymer having terminal moisture curable silyl groups containing reactive hydroxyl or hydrolysable groups bonded to silicon. The organic polymer can for example be selected from polyethers, hydrocarbon polymers, acrylate polymers, polyurethanes and polyureas.

One preferred type of polyether is a polyoxyalkylene polymer comprising recurring oxyalkylene units of the formula ($-C_nH_{2n}-O-$) wherein n is an integer from 2 to 4 inclusive, as described above in connection with siloxane polyoxyalkylene block copolymers. Polyoxyalkylenes usually have terminal hydroxyl groups and can readily be terminated with moisture curable silyl groups, for example by reaction with an excess of an alkyltrialkoxysilane to introduce terminal alkyldialkoxysilyl groups. Alternatively polymerization may occur via a hydrosilylation type process. Polyoxyalkylenes consisting wholly or mainly of oxypropylene units have properties suitable for many sealant uses. Polyoxyalkylene polymers, particularly polyoxypropylenes, having terminal alkyldialkoxysilyl or trialkoxysilyl groups may be particularly suitable for use as a polymer (A) having reactive groups which react with each other in the presence of moisture and which do not need a separate crosslinking agent (B) in the composition.

Examples of silyl modified hydrocarbon polymers include silyl modified polyisobutylene, which is available commercially in the form of telechelic polymers. Silyl modified polyisobutylene can for example contain curable silyl groups derived from a silyl-substituted alkyl acrylate or methacrylate monomer such as a dialkoxyalkylsilylpropyl methacrylate or trialkoxysilylpropyl methacrylate, which can be reacted with a polyisobutylene prepared by living anionic polymerization, atom transfer radical polymerization or chain transfer polymerization.

The organic polymer having hydrolysable silyl groups can alternatively be an acrylate polymer, that is an addition polymer of acrylate and/or methacrylate ester monomers, which preferably comprise at least 50% by weight of the monomer units in the acrylate polymer. Examples of acrylate ester monomers are n-butyl, isobutyl, n-propyl, ethyl, methyl, n-hexyl, n-octyl and 2-ethylhexyl acrylates. Examples of methacrylate ester monomers are n-butyl, isobutyl, methyl, n-hexyl, n-octyl, 2-ethylhexyl and lauryl methacrylates. For sealant use, the acrylate polymer preferably has a glass transition temperature (Tg) below ambient temperature; acrylate polymers are generally preferred over methacrylates since they form lower Tg polymers. Polybutyl acrylate is particularly preferred. The acrylate polymer can contain lesser amounts of other monomers such as styrene, acrylonitrile or acrylamide. The acrylate(s) can be polymerized by various methods such as conventional radical polymerization, or living radical polymerization such as atom transfer radical polymerization, reversible addition-fragmentation chain transfer polymerization, or anionic polymerization including living anionic polymerization. The curable silyl groups can for example be derived from a silyl-substituted alkyl acrylate or methacrylate monomer. Hydrolysable silyl groups such as dialkoxyalkylsilyl or trialkoxysilyl groups can for example be derived from a dialkoxyalkylsilylpropyl methacrylate or trialkoxysilylpropyl methacrylate. When the acrylate polymer has been prepared by a polymerization process which forms reactive terminal groups, such as atom transfer radical polymerization, chain transfer polymerization, or living anionic polymerization, it can readily be reacted with the silyl-substituted alkyl acrylate or methacrylate monomer to form terminal hydrolysable silyl groups.

Silyl modified polyurethanes or polyureas can for example be prepared by the reaction of polyurethanes or polyureas having terminal ethylenically unsaturated groups with a silyl monomer containing hydrolysable groups and a Si—H group, for example a dialkoxyalkylsilicon hydride or trialkoxysilicon hydride.

In one embodiment the polymer may comprise a diorganopolysiloxane having a viscosity in the range of 20 to 1,000,000 mP·s at 25° C. having: 20 to 100 parts by weight of a diorganopolysiloxane (A-1) capped at both molecular terminals with alkoxysilyl groups or hydroxysilyl groups, and 0 to 80 parts by weight of a diorganopolysiloxane (A-2) capped at one molecular terminal with an alkoxysilyl group or a hydroxysilyl group and capped at the other molecular terminal with an alkyl group or an alkenyl group. This combination is often utilized for multi-part compositions. When present in combination typically (A-1) and (A-2) are present in a (A-1):(A-2) weight ratio of from 100:0 to 20:80, alternatively (A-1):(A-2) from 100:0 to 60:40, and further alternatively from 100:0 to 80:20.

If the viscosity of constituents (A-1) and (A-2) is too low (i.e. <20 mPa·s at 25° C., this will reduce strength of the silicone elastomer obtained by curing the composition, and, if, on the other hand, the aforementioned constituents are too viscous, this will affect the production time and time of use. It is recommended that, when present, the constituents (A-1) and (A-2) have viscosities in the range of 20 to 1,000,000 mPa·s, alternatively in the range of 100 to 500,000 mPa·s, at 25° C., alternatively in the range of 100 to 100,000 mPa·s, at 25° C. in each case, as mentioned above, measured using a Brookfield® viscometer using a DV-2 THB RV/MA/HB-3 spindle.

The crosslinker (B) contains at least two, alternatively at least three groups reactive with the silicon-bonded hydroxyl or hydrolysable groups of polymer (A). The reactive groups of crosslinker (B) are themselves preferably silanol groups or silicon bonded hydrolysable groups, most preferably hydrolysable groups. The cross-linker can for example be a silane or short chain organopolysiloxane, for example a polydiorganosiloxane having from 2 to about 100 siloxane units. The molecular structure of such an organopolysiloxane can be straight chained, branched, or cyclic. The cross-linker (B) can alternatively be an organic polymer substituted by silicon-bonded hydrolysable groups. For the avoidance of doubt, cross-linker (B) has a structure which does not fall within the scope of silane D.

The hydrolysable groups in the crosslinker can for example be selected from acyloxy groups (for example, acetoxy, octanoyloxy, and benzoyloxy groups); ketoximino groups (for example dimethyl ketoximo, and isobutylketoximino); alkoxy groups (for example methoxy, ethoxy, and propoxy) and/or alkenyloxy groups (for example isopropenyloxy and 1-ethyl-2-methylvinyloxy).

Typically the crosslinking agent (B) is a silane having three silicon-bonded hydrolysable groups per molecule. In such cases, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably the fourth silicon-bonded organic group is methyl or ethyl.

Examples of crosslinking agents (B) include acyloxysilanes, particularly acetoxysilanes such as methyltriacetoxysilane, vinyltriacetoxysilane, ethyl triacetoxysilane, di-butoxy diacetoxysilane and/or dimethyltetraacetoxydisiloxane, and also phenyl-tripropionoxysilane. The crosslinking agent can be an oxime-functional silane such as methyltris(methylethylketoximo)silane, vinyl-tris(methylethylketoximo)silane, or an alkoxytrioximosilane. The crosslinking agent can be an alkoxysilane, for example an alkyltrialkoxysilane such as methyltrimethoxysilane, methyltriethoxysilane, isobutyltrimethoxysilane or ethyltrimethoxysilane, an alkenyltrialkoxysilane such as vinyltrimethoxysilane or vinyltriethoxysilane, or phenyltrimethoxysilane, 3,3,3-trifluoropropyltrimethoxysilane, or ethylpolysilicate, n-propylorthosilicate, ethylorthosilicate, or an alkenyloxysilane such as methyltris(isopropenoxy)silane or vinyltris(isopropenoxy)silane. The crosslinking agent can alternatively be a short chain polydiorganosiloxane, for example polydimethylsiloxane, with trimethoxysilyl terminal groups or can be an organic polymer, for example a polyether such as a polypropylene oxide with terminal groups having methoxysilane functionality such as trimethoxysilyl groups. The cross-linker used may also comprise any combination of two or more of the above.

Further alternative cross-linkers include alkylalkenylbis (N-alkylacetamido) silanes such as methylvinyldi-(N-methylacetamido)silane, and methylvinyldi-(N-ethylacetamido)silane; dialkylbis(N-arylacetamido) silanes such as dimethyldi-(N-methylacetamido)silane; and dimethyldi-(N-ethylacetamido)silane; alkylalkenylbis(N-arylacetamido) silanes such as methylvinyldi(N-phenylacetamido)silane and dialkylbis(N-arylacetamido) silanes such as dimethyldi-(N-phenylacetamido)silane, or any combination of two or more of the above. Typically when some of cross-linker (B) has only 2 reactive groups, they are present in a mixture with other cross-linkers (B) having 3 or 4 reactive groups in order to ensure cross-linking.

The amount of crosslinking agent (B) present in the composition will depend upon the particular nature of the crosslinking agent, particularly its molecular weight. The compositions suitably contain crosslinker (B) in at least a stoichiometric amount as compared to the polymer (A). Compositions may contain, for example, from 1-30% by weight of crosslinker (B), generally from 1 to 10%. For example, cross-linkers (B) containing acetoxy groups or oximino groups may typically be present in amounts of from 3 to 8% by weight of the composition.

The filler (C) can for example be a reinforcing filler, which will improve the mechanical properties of the composition, such as high surface area fumed and precipitated silicas and to a degree precipitated calcium carbonate, and/or can comprise a non-reinforcing filler such as crushed quartz, ground calcium carbonate, diatomaceous earth, barium sulphate, iron oxide, titanium dioxide, carbon black, talc, crystobalite, mica, feldspar or wollastonite. Other fillers which might be used alone or in addition to the above include aluminite, calcium sulphate (anhydrite), gypsum, magnesium carbonate, aluminium trihydroxide, magnesium hydroxide (brucite), graphite, copper carbonate, e.g. malachite, nickel carbonate, barium carbonate, strontium carbonate, aluminium oxide, or silicates from the group consisting of the olivine group, the garnet group, aluminosilicates, ring silicates, chain silicates and sheet silicates, or plastic or glass microspheres, preferably hollow microspheres. The filler, when present in the composition may be present in a preferred range of 3 to 400 parts by weight per 100 parts of polymer (A) of the moisture curable composition. Typically when filler is present at least some filler in the composition will be reinforcing.

In addition, a surface treatment of the filler(s) may be performed, for example with a fatty acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the other sealant components The surface treatment of the fillers makes the fillers e.g. ground calcium carbonate and/or precipitated calcium carbonate easily wetted by the silicone polymer. These surface modified fillers do not clump, and can be homogeneously incorporated into the silicone polymer. This results in improved room temperature mechanical properties of the uncured compositions. Furthermore, the surface treated fillers give a lower conductivity than untreated or raw material. The filler(s) (C) may for example be precipitated silica, ground calcium carbonate and/or precipitated calcium carbonate each of which has independently been treated by a treating agent discussed above, typically stearic acid or a stearate.

The proportion of such fillers when employed will depend on the properties desired in the elastomer-forming composition and the resulting cured elastomer. Usually the filler content of the composition will reside within the range from about 5 to about 800 parts by weight, preferably from 25 to 400 parts by weight per 100 parts by weight of polymer A.

Silane (D), as hereinbefore described has the following structure:

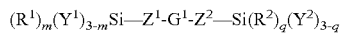

In which
R$^1$ and R$^2$ are alkoxy groups containing from 1 to 6 carbons
Y$^1$ and Y$^2$ are alkyl groups containing from 1 to 8 carbons
Z$^1$ and Z$^2$ are alkylene groups having from 1 to 12 carbons
G$^1$ and G$^2$ are chemical groups containing a heteroatom with a lone pair of electrons; and
m and q are independently 1, 2 or 3.

Each R$^1$ and R$^2$ may be the same or different and have from 1 to 6 carbons and alternatively each R$^1$ and R$^2$ contains 1 to 3 carbons. In a further alternative each R$^1$ and R$^2$ is either a methoxy group or an ethoxy group.

Y$^1$ and Y$^2$ are linear or branched alkyl groups containing from 1 to 8 carbons, alternatively containing 1 to 6 carbon atoms Each of Z$^1$ and Z$^2$ may be the same or different and are linear or branched alkylene groups having from 1 to 12 carbons, alternatively linear or branched alkylene groups having from 1 to 6 carbons, further alternatively linear alkylene groups containing 2 to 4 carbon atoms. G$^1$ is a chemical group containing a heteroatom with a lone pair of electrons such as a secondary amine or a substituted urea group. The subscripts m and q are independently 1, 2 or 3, alternatively 2 or 3.

Examples of Silane, (D), include:
bis(trialkoxysilylalkyl)amines, bis(dialkoxyalkylsilylalkyl)amine,
bis[trialkoxysilylalkyl) N-alkylamine, bis[dialkoxyalkylsilylalkyl) N-alkylamine and
bis(trialkoxysilylalkyl)urea and bis(dialkoxyalkylsilylalkyl) urea.

Specific suitable examples include example bis[3-trimethoxysilylpropyl)amine, bis[3-triethoxysilylpropyl) amine, bis[4-trimethoxysilylbutyl)amine, bis[4-triethoxysilylbutyl)amine, bis[3-trimethoxysilylpropyl)N-methylamine, bis[3-triethoxysilylpropyl) N-methylamine, bis[4-trimethoxysilylbutyl) N-methylamine, bis[4-triethoxysilylbutyl) N-methylamine, bis[3-trimethoxysilylpropyl) urea, bis[3-triethoxysilylpropyl)urea, bis[4-trimethoxysilylbutyl)urea, bis[4-triethoxysilylbutyl)urea, bis[3-dimethoxymethylsilylpropyl)amine, bis[3-diethoxymethyl silylpropyl)amine, bis[4-dimethoxymethylsilylbutyl)amine, bis[4-diethoxymethyl silylbutyl)amine, bis[3-dimethoxymethylsilylpropyl) N-methylamine, bis[3-diethoxymethyl silylpropyl) N-methylamine, bis[4-dimethoxymethylsilylbutyl) N-methylamine, bis[4-diethoxymethyl silylbutyl) N-methylamine, bis[3-dimethoxymethylsilylpropyl)urea, bis[3-diethoxymethyl silylpropyl)urea, bis[4-dimethoxymethylsilylbutyl)urea, bis[4-diethoxymethyl silylbutyl)urea, bis[3-dimethoxyethylsilylpropyl)amine, bis[3-diethoxyethyl silylpropyl)amine, bis[4-dimethoxyethylsilylbutyl)amine, bis[4-diethoxyethyl silylbutyl)amine, bis[3-dimethoxyethylsilylpropyl)N-methylamine, bis[3-diethoxyethyl silylpropyl) N-methylamine, bis[4-dimethoxyethylsilylbutyl) N-methylamine, bis[4-diethoxyethyl silylbutyl) N-methylamine, bis[3-dimethoxyethylsilylpropyl)urea bis[3-diethoxyethyl silylpropyl)urea, bis[4-dimethoxyethylsilylbutyl)urea and/or bis[4-diethoxyethyl silylbutyl)urea.

Alternatively silane D is selected from bis(triethoxysilylpropyl)amine, bis(trimethoxysilylpropyl)amine, bis [trimethoxysilylpropyl)urea bis[triethoxysilylpropyl)urea and bis(diethoxymethylsilylpropyl)N-methylamine and mixtures thereof.

The composition of the invention can include other ingredients known for use in moisture curable compositions based on silicon-bonded hydroxyl or hydrolysable groups such as sealant compositions. The composition may comprise a silicone or organic fluid which is not reactive with polymer (A) or crosslinking agent (B). Such a silicone or organic fluid acts as a plasticizer or extender (sometimes referred to as a processing aid) in the composition. The silicone or organic fluid can be present in up to 200 parts by weight of the moisture curable composition per 100 parts of polymer (A), for example from 5 or 10 parts by weight up to 150 parts by weight based on 100 parts by weight of polymer (A).

Examples of non-reactive silicone fluids useful as plasticizers include polydiorganosiloxanes such as polydimethylsiloxane having terminal triorganosiloxy groups wherein the organic substituents are, for example, methyl, vinyl or phenyl or combinations of these groups. Such polydimethylsiloxanes can for example have a viscosity of from about 5 to about 100,000 mPa·s at 25° C.

Examples of compatible organic plasticisers which can be used additionally to or instead of the silicone fluid plasticiser include dialkyl phthalates wherein the alkyl group may be linear and/or branched and contains from six to 20 carbon atoms such as dioctyl, dihexyl, dinonyl, didecyl, diallanyl and other phthalates, and analogous adipate, azelate, oleate and sebacate esters; polyols such as ethylene glycol and its derivatives; and organic phosphates such as tricresyl phosphate and/or triphenyl phosphates.

Examples of extenders for use in compositions according to the invention, particularly silicone sealant compositions, include mineral oil based (typically petroleum based) paraffinic hydrocarbons, mixtures of paraffinic and naphthenic hydrocarbons, paraffin oils comprising cyclic paraffins and non-cyclic paraffins and hydrocarbon fluids containing naphthenics, polycyclic naphthenics and paraffins, or polyalkylbenzenes such as heavy alkylates (alkylated aromatic materials remaining after distillation of oil in a refinery). Examples of such extenders are discussed in GB2424898 the content of which is hereby enclosed by reference. Such a hydrocarbon extender can for example have an ASTM D 86-09 boiling point of from 235° C. to 400° C. An example of a preferred organic extender is the hydrocarbon fluid sold by Total under the trade mark Hydroseal® G250H. The extender or plasticiser may alternatively comprise one or more non-mineral based natural oil, i.e. an oil derived from animals, seeds or nuts and not from petroleum, or a derivative thereof such as a transesterified vegetable oil, a boiled natural oil, a blown natural oil, or a stand oil (thermally polymerized oil).

Other ingredients which may be included in the compositions include but are not restricted to rheology modifiers; adhesion promoters, pigments, heat stabilizers, flame retardants, UV stabilizers, chain extenders, cure modifiers, electrically and/or heat conductive fillers, and fungicides and/or biocides and the like.

The rheology modifiers include silicone organic co-polymers such as those described in EP 0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide and propylene oxide, and silicone polyether copolymers; as well as silicone glycols. For some systems these rheology modifiers, particularly copolymers of ethylene oxide and propylene oxide, and silicone polyether copolymers, may enhance the adhesion of the sealant to substrates, particularly plastic substrates.

Examples of adhesion promoters which may be incorporated in moisture curable compositions according to the invention include alkoxysilanes such as aminoalkylalkoxysilanes, for example 3-aminopropyltriethoxysilane, epoxyalkylalkoxysilanes, for example, 3-glycidoxypropyltrimethoxysilane and, mercapto-alkylalkoxysilanes, and reaction products of ethylenediamine with silylacrylates. Isocyanurates containing silicon groups such as 1,3,5-tris(trialkoxysilylalkyl) isocyanurates may additionally be used. Further suitable adhesion promoters are reaction products of epoxyalkylalkoxysilanes such as 3-glycidoxypropyltrimethoxysilane with amino-substituted alkoxysilanes such as 3-aminopropyltrimethoxysilane and optionally with alkylalkoxysilanes such as methyltrimethoxysilane.

Chain extenders may include difunctional silanes which extend the length of the polysiloxane polymer chains before cross linking occurs and, thereby, reduce the modulus of elongation of the cured elastomer. Chain extenders and crosslinkers compete in their reactions with the functional polymer ends; in order to achieve noticeable chain extension, the difunctional silane must have substantially higher reactivity than the trifunctional crosslinker with which it is used. Suitable chain extenders include diamidosilanes such as dialkyldiacetamidosilanes or alkenylalkyldiacetamidosilanes, particularly methylvinyldi(N-methylacetamido)silane, or dimethyldi(N-methylacetamido)silane, diacetoxysilanes such as dialkyldiacetoxysilanes or alkylalkenyldiacetoxysilanes, diaminosilanes such as dialkyldiaminosilanes or alkylalkenyldiaminosilanes, dialkoxysilanes such as dimethoxydimethylsilane, diethoxydimethylsilane and α-aminoalkyldialkoxyalkylsilanes, polydialkylsiloxanes having a degree of polymerization of from 2 to 25 and having at least two acetamido or acetoxy or amino or alkoxy or amido or ketoximo substituents per molecule, and diketoximinosilanes such as dialkylkdiketoximinosilanes and alkylalkenyldiketoximinosilanes.

Electrically conductive fillers may include carbon black, metal particles such as silver particles any suitable electrically conductive metal oxide fillers such as titanium oxide powder whose surface has been treated with tin and/or antimony, potassium titanate powder whose surface has been treated with tin and/or antimony, tin oxide whose surface has been treated with antimony, and zinc oxide whose surface has been treated with aluminium. Thermally conductive fillers may include metal particles such as powders, flakes and colloidal silver, copper, nickel, platinum, gold aluminium and titanium, metal oxides, particularly aluminium oxide ($Al_2O_3$) and beryllium oxide (BeO); magnesium oxide, zinc oxide, zirconium oxide.

Pigments are utilised to colour the composition as required. Any suitable pigment may be utilised providing it is compatible with the composition. In two part compositions pigments and/or coloured (non-white) fillers e.g. carbon black may be utilised typically in one part of the composition and may be relied upon to show good mixing of the different parts prior to application.

Biocides may additionally be utilized in the composition if required. It is intended that the term "biocides" includes bactericides, fungicides and algicides, and the like. Suitable examples of useful biocides which may be utilised in compositions as described herein include, for the sake of example:
Carbamates such as methyl-N-benzimidazol-2-ylcarbamate (carbendazim) and other suitable carbamates, 10,10'-oxybisphenoxarsine, 2-(4-thiazolyl)-benzimidazole, N-(fluorodichloromethylthio)phthalimide, diiodomethyl p-tolyl sulfone, if appropriate in combination with a UV stabilizer, such as 2,6-di(tert-butyl)-p-cresol, 3-iodo-2-propinyl butylcarbamate (IPBC), zinc 2-pyridinethiol 1-oxide, triazolyl compounds andisothiazolinones, such as 4,5-dichloro-2-(n-octyl)-4-isothiazolin-3-one (DCOIT), 2-(n-octyl)-4-isothiazolin-3-one (OIT) and n-butyl-1,2-benzisothiazolin-3-one (BBIT). Other biocides might include for example Zinc Pyridinethione, 1-(4-Chlorophenyl)-4,4-dimethyl-3-(1,2,4-triazol-1-ylmethyl)pentan-3-ol and/or 1-[[2-(2,4-dichlorophenyl)-4-propyl-1,3-dioxolan-2-yl] methyl]-1H-1,2,4-triazole.

The fungicide and/or biocide may suitably be present in an amount of from 0 to 0.3% by weight of the composition and may be present in an encapsulated form where required such as described in EP2106418.

In the case of one part compositions typically the composition comprises 30 to 70 weight % of polymer (A) containing reactive hydroxyl or hydrolysable groups bonded to silicon which groups are reactive in the presence of moisture 0.5-10 weight % of crosslinking agent (B) comprising at least two and preferably at least three groups reactive with the silicon-bonded hydroxyl or hydrolysable groups of polymer (A). 30 to 70 weight % of one or more reinforcing or semi-reinforcing fillers (C) and 0.5-10 weight % silane (D) as hereinbefore described With the total weight % of any one of said compositions being 100 weight %. Such compositions do not require a standard condensation catalyst because silane (D) functions as the catalyst.

In the case of 2 part compositions there is provided a base composition, comprising: 30 to 70 weight % of polymer (A) containing reactive hydroxyl or hydrolysable groups bonded to silicon which groups are reactive in the presence of moisture and 30 to 70 weight % of one or more reinforcing or semi-reinforcing fillers (C). Suitable additives as hereinbefore described may also be present and the base composition total to 100 weight % of the base composition; and a cross-linking composition, comprising: crosslinking agent (B) comprising at least two and preferably at least three groups reactive with the silicon-bonded hydroxyl or hydrolysable groups of polymer (A) and silane (D) as hereinbefore described in a ratio of (B):(D) of between 1:9 and 9:1, alternatively between 3:7 and 7:3, alternatively between 2:3 and 3:2.

Optionally the Crosslinking part may additionally comprise one or more polymers (E) unreactive with components (B) and (D) and/or a pigment or coloured filler (F). Typically the unreactive polymer functions as a plasticiser or extender and is selected from polydimethylsiloxane having terminal triorganosiloxy groups wherein the organic substituents are, for example, methyl, vinyl or phenyl or combinations of these groups. Such polydimethylsiloxanes can for example have a viscosity of from about 5 to about 100,000 mPa·s at 25° C. Alternatively organic polymers such as mineral oil based (typically petroleum based) paraffinic hydrocarbons may be used, i.e. mixtures of paraffinic and naphthenic hydrocarbons, paraffin oils comprising cyclic paraffins and non-cyclic paraffins and hydrocarbon fluids containing naphthenics, polycyclic naphthenics and paraffins.

When/if components (E) and/or (F) are present in the cross-linking composition, depending on the intended mix ratio with the base composition the cross-linking composition comprises:

2 to 50 weight % of a crosslinking agent (B) comprising at least two and preferably at least three groups reactive with the silicon-bonded hydroxyl or hydrolysable groups of polymer (A) and 1 to 50 weight % of silane (D) as hereinbefore described, (E) 5 to 30 weight % of one or more polymers unreactive with (A) or (C); and (F) 1 to 15 weight % of one or more pigments or coloured fillers.

Furthermore, the cross-linking composition may contain 0 to 50 weight % of filler (C) depending on the mixing ratio of the two parts of the composition. Typically the ratio of the base composition:cross-linking composition is between 15:1 and 1:1, alternatively between 10:1 and 1:1. If the intended mixing ratio of base composition:cross-linking composition is 10:1 or greater then no filler (C) will be generally utilized in the cross-linking composition. However if the intended mixing ratio of base composition:cross-linking composition is less than 10:1 than an increasing amount filler (C) will be utilized in the cross-linking composition up to the maximum of 50% if the intended ratio is 1:1.

The moisture curable compositions can be prepared by mixing the ingredients employing any suitable mixing equipment. For example, preferred one-part moisture curable compositions may be made by mixing polysiloxane (A) with filler (B) and mixing the resulting base with a pre-mix of the crosslinking agent and the dipodal silane. Other additives such as plasticisers and/or extenders, UV stabilizer, pigments and biocides may be added to the mixture at any desired stage. The final mixing step is carried out under substantially anhydrous conditions, and the resulting curable compositions are generally stored under substantially anhydrous conditions, for example in sealed containers, until required for use.

In the case of 2 part sealant compositions, the components of each part are mixed together in amounts within the ranges given above and then the base composition and the cross-linker part are inter-mixed in a predetermined ratio e.g. from 15:1 to 1:1, alternatively from 12:1 to 5:1.

Such one-part moisture curable compositions according to the invention are stable in storage but cure on exposure to atmospheric moisture produce elastomeric bodies despite not containing the aforementioned metallic catalysts.

Resulting compositions may be employed in a variety of applications, for example as coating, caulking, mold making and encapsulating materials. They are particularly suitable for sealing joints, cavities and other spaces in articles and structures which are subject to relative movement. They are thus particularly suitable as glazing sealants or adhesives and for sealing building structures where the visual appearance of the sealant is important. They are also useful as insulating glass sealants, structural sealants for building applications. Further applications for the composition hereinbefore described include sealing compositions for electrical/electronic devices, automotive parts and solar modules.

The preceding compositions are henceforth illustrated by the following Examples, in which parts and percentages are by weight, unless otherwise indicated. All viscosities of starting materials are given as pre-measured values provided by suppliers and viscosity measurements taken during experiments were measured using a Brookfield® viscometer using a DV-2 THB RV/MA/HB-3 spindle and all viscosity measurements were taken at 25° C. unless otherwise indicated.

Base Composition

The base composition used throughout the Examples was the same for all examples and comprised:

52.6 weight % of a hydroxyl terminated polydimethylsiloxane polymer partially terminated with trimethylsilyl groups having a viscosity of about 12,500 mPa·s at 25° C. (henceforth referred to as "Polymer I"), and 46.02 weight % of Winnofil® SMS. a commercially available calcium carbonate filler with stearic acid sold by Solvay S.A.1.38 weight % of short chain hydroxyl terminated polydimethylsiloxane of ca. 40 mPa·s at 25° C. (henceforth referred to as "Polymer 2"),

EXAMPLE 1

Moisture curable sealant compositions were prepared by mixing the ingredients listed in a Hausschild laboratory mixer (dental mixer) and where required filling the mixed composition into cartridges.

Tables 1a depicts the composition of the base composition of the 2 part compositions tested in example 1 for their cure properties. It will be noted that, for comparative purposes, as previously indicated the same base composition was used in all samples and comparative samples. Tables 1b and 1d provide details of the cross-linking compositions mixed with the equivalently numbered base compositions. The base compositions and the cross-linking compositions were mixed in a ratio of 10 parts by weight of base composition to every 1 part by weight of crosslinking composition. Tables 1c and 1e provide details of observations during the cure process of the compositions in Tables 1a 1b and 1c respectively comparing the use of silanes (D) as hereinbefore described as well as non-functional silanes, 1,6-Bis (trimethoxysilyl)hexane and 1,2-bis(trimethoxysilyl)decane. 1,6-Bis(trimethoxysilyl)hexane may be added in current two-part formulations for better durability after hot water adhesion (comp sample 3). The compositions detailed in Table 1a, 1b and 1d involving the aforementioned non-functional silanes used tin II octoate as the catalyst whereas the functional silanes used no catalyst.

TABLE 1a

Base Compositions

| Base Composition | Control | Comp Sample 1 | Sample 1 | Comp Sample 2 | Sample 2 | Comp Sample 3 | Comp Sample 4 |
|---|---|---|---|---|---|---|---|
| Polymer 1 | 52.6 | 52.6 | 52.6 | 52.6 | 52.6 | 52.6 | 52.6 |
| Winnofil ® SMS | 46.02 | 46.02 | 46.02 | 46.02 | 46.02 | 46.02 | 46.02 |
| Polymer 2 | 1.38 | 1.38 | 1.38 | 1.38 | 1.38 | 1.38 | 1.38 |
| Total | 100 | 100 | 100 | 100 | 100 | 100 | 100 |

TABLE 1b

| Curing Agent Composition | Control | Comp Sample 1 | Sample 1 | Comp Sample 2 |
|---|---|---|---|---|
| Trimethylsiloxy-terminated Dimethyl Siloxane (60,000 mPa·s) | 38.73 | 39.50 | 39.90 | 38.73 |
| Carbon Black | 15.49 | 15.80 | 15.96 | 15.49 |
| Tetra-n-propylorthosilicate (NPOS) | 23.65 | 23.70 | 23.94 | 23.65 |
| Dibutyl tin dilaurate | 1.20 | | | |
| Tin (II) octoate | | 1.20 | | 1.20 |
| Aminopropyltriethoxysilane | 19.96 | | | |
| 1,6-Bis(trimethoxysilyl)hexane | | 19.80 | | |
| Bis[3-trimethoxysilyl)propyl-amine | | | 20.20 | 19.96 |
| Total | 100 | 100 | 100 | 100 |

TABLE 1c

| Progress of Cure | Control | Comp Sample 1 | Sample 1 | Comp Sample 2 |
|---|---|---|---|---|
| 4 hours | Cured | No cure | Partial cure | Cured |
| 24 hours | Cured | No cure | Cured | Cured |
| 48 hours | Cured | No cure | Cured with little tack | Cured with little tack |

TABLE 1d further curing Agent Compositions

| Curing Agent Compositions | Curing Agent Control | Sample 2 | Comp Sample 3 | Comp Sample 4 |
|---|---|---|---|---|
| Trimethylsiloxy-terminated Dimethyl Siloxane (60,000 mPa·s) | 38.73 | 37.98 | 38.73 | 38.73 |
| Carbon Black | 15.49 | 15.19 | 15.49 | 15.49 |
| Tetra-n-propylorthosilicate (NPOS) | 23.65 | 22.79 | 23.65 | 23.65 |

TABLE 1d-continued further curing Agent Compositions

| Curing Agent Compositions | Curing Agent Control | Sample 2 | Comp Sample 3 | Comp Sample 4 |
|---|---|---|---|---|
| Dibutyl tin dilaurate | 1.20 | | | |
| Tin (II) octoate | | | 1.20 | 1.20 |
| Aminopropyltriethoxysilane | 19.96 | | | |
| 1,2-bis(trimethoxysilyl)decane | | | | 19.96 |
| Bis[3-trimethoxysilyl)propyl-amine | | 24.04 | | |
| Bis[3-trimethoxysilyl) Propylethylenediamine | | | 19.96 | |
| Total | 100 | 100 | 100 | 100 |

TABLE 1e

| Progress to Cure | Control | Sample 2 | Comp Sample 3 | Comp Sample 4 |
|---|---|---|---|---|
| 4 hours | Cured | Almost completely cured | Partial Cure | No noticeable cure |
| 24 hours | Cured | cured | No change | No change |
| 48 hours | Cured | Solid but tacky | Not fully cured | No Cure |

Compositions containing the silanes 1,6-Bis(trimethoxysilyl)hexane 1,2-bis(trimethoxysilyl)decane failed to cure even in the presence of tin catalysts after 48 hours cure time. (Comp Samples 1 and 4). It must be appreciated that if a two-part sealant composition has not cured after 24 hours there isn't much benefit over a one-part composition which would be expected to cure much slower than the 2 part composition. Sample 1, comparative sample 2 and Sample 2 again showed better results than Comp Sample 3. Compositions containing Bis[3-trimethoxysilyl) propylethylenediamine and like materials (e.g. Comp sample 3) were originally expected to cure relying solely on Bis[3-trimethoxysilyl) propylethylenediamine itself as catalyst because of the similarity of their structures to compositions containing Bis[3-trimethoxysilyl)propylamine and the like. However, surprisingly this proved not to be the case. Unexpectedly compositions containing such molecules failed to cure even in the presence of tin catalysts (Comp sample 3).

EXAMPLE 2

Example 2 focused more on Bis[3-trimethoxysilyl)propylamine and testing of cured properties by durometer, tensile, and elongation of compositions cured with Bis[3-trimethoxysilyl)propylamine. Again throughout Example 2 the same base was used as in Example 1 and as such was not depicted in the following Tables. The cross-linking composition depicted in Tables 2a and 2b were mixed with said base compositions in a ratio of 10 parts base composition to 1 part cross-linking composition.

TABLE 2a

Cross-linker composition

| Cross-Linking Composition | Curing Agent Control | Sample 3 | Comp Sample 5 | Sample 4 |
|---|---|---|---|---|
| Trimethylsiloxy-terminated Dimethyl Siloxane (60,000 mPa · s) | 39.42 | 39.90 | 39.42 | 37.98 |
| Carbon Black | 15.77 | 15.96 | 15.77 | 15.19 |
| Tetra-n-propylorthosilicate (NPOS) | 23.65 | 23.94 | 23.65 | 22.79 |
| Dibutyl tin dilaurate | 1.20 | | | |
| Tin (II) octoate | | | 1.20 | |
| aminopropyltriethoxysilane | 19.96 | | | |
| Bis[3-trimethoxysilyl)propylamine | | 20.20 | 19.96 | 24.04 |
| Total | 100 | 100 | 100 | 100 |

TABLE 2b

Cross-linking Compositions

| Cross-Linking Composition | Curing Agent Control | Sample 5 | Sample 6 | Comp Sample 6 |
|---|---|---|---|---|
| Trimethylsiloxy-terminated Dimethyl Siloxane (60,000 mPa · s) | 39.42 | 42.50 | 45.00 | 39.90 |
| Carbon Black | 15.77 | 17.00 | 18.00 | 15.96 |
| Tetra-n-propylorthosilicate (NPOS) | 23.65 | 25.50 | 27.00 | 23.94 |
| Dibutyl tin dilaurate | 1.20 | | | |
| aminopropyltriethoxysilane | 19.96 | | | |
| Bis[3-trimethoxysilyl)propylamine | | 15.00 | 10.00 | |
| Bis[3-trimethoxysilyl) propylethylenediamine | | | | 20.20 |
| Total | 100 | 100 | 100 | 100 |

The Physical properties of the cured elastomers resulting from cure of the base compositions mixed with the cross-linking compositions in Tables 2a and 2b are depicted in Table 2c and 2d respectively below. It was found that comp sample 6 remained uncured even after 7 days and therefore no results are given for that composition, showing again that unexpectedly Bis[3-trimethoxysilyl) propylethylenediamine containing compositions did not cure.

'Tensile' means tensile strength (breaking stress) in kPa. The tensile tests were performed in accordance with ASTM D412-98a with 3 mm sheets after 1 week cure according to ASTM D412-98a. 'Modulus 25%, 50% and 100%' is the nominal stress (or apparent stress, in kPa) at 25%, 50% and 100% elongation respectively. Elongation is given in % according to ASTM D412-98 a for 2 mm sheets. The Hardness was Shore A hardness measured according to ASTM D2240-02b.

TABLE 2c

Cured properties of Compositions resulting from the mixture of base compositions with those cross-linking compositions depicted in Table 2a and 2b after 24 hrs

| Curing Agent | Duro | Tensile Strength (kPa) | Elongation (%) | 25% modulus (kPa) | 50% modulus (kPa) | 100% modulus (kPa) |
|---|---|---|---|---|---|---|
| Control | 40 | 1716.9 | 298 | 262.0 | 427.5 | 572.3 |
| Sample 3 | 21 | 399.9 | 219 | 151.7 | 220.6 | 296.5 |
| Comp sample 5 | 35 | 2006.4 | 351 | 241.3 | 413.7 | 703.3 |
| Sample 4 | 24 | 572.3 | 285 | 172.4 | 241.3 | 337.9 |
| Sample 5 | 16 | 234.4 | 189 | 117.2 | 158.6 | 206.9 |
| Sample 6 | 40 | | | | | |

TABLE 2d

Cured properties of Compositions resulting from the mixture of base compositions with those cross-linking compositions depicted in Table 2a and 2b after 7 days

| Curing Agent | Duro | Tensile Strength (kPa) | Elongation (%) | 25% modulus (kPa) | 50% modulus (kPa) | 100% modulus (kPa) |
|---|---|---|---|---|---|---|
| Control | 40 | 1951.3 | 338 | 282.7 | 448.2 | 730.9 |
| Sample 3 | 39 | 2185.7 | 419 | 324.1 | 496.4 | 758.4 |
| Comp Sample 5 | 41 | 2130.6 | 298 | 296.5 | 510.2 | 868.8 |
| Sample 4 | 42 | 2247.8 | 392 | 358.5 | 530.9 | 820.5 |
| Sample 5 | 32 | 2096.1 | 584 | 234.4 | 379.2 | 579.2 |

The Bis[3-trimethoxysilyl)propylamine containing compositions were able to cure a two-part system without the addition of a tin catalyst. The sample was cured enough to test after 1 day and exhibited similar durometer, tensile, and elongation to the control sample with catalyst after 7 days.

The invention claimed is:
1. A moisture curable composition comprising:
(A) a polymer containing reactive hydroxyl or hydrolysable groups bonded to silicon which groups are reactive in the presence of moisture;
(B) a crosslinking agent comprising at least two groups reactive with the silicon-bonded hydroxyl or hydrolysable groups of polymer (A);
(C) one or more reinforcing and/or non-reinforcing fillers; and
(D) a silane having the structure

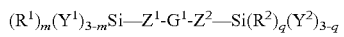

$(R^1)_m(Y^1)_{3-m}Si-Z^1-G^1-Z^2-Si(R^2)_q(Y^2)_{3-q}$ where $R^1$ and $R^2$ are alkoxy groups containing from 1 to 6 carbons,
$Y^1$ and $Y^2$ are alkyl groups containing from 1 to 8 carbons,
$Z^1$ and $Z^2$ are alkylene groups having from 1 to 12 carbons,
$G^1$ is a chemical group containing a heteroatom with a lone pair of electrons, and
m and q are independently 1, 2 or 3;
wherein silane (D) is present in an amount of from 15 to 30% by weight of the composition and functions as a cure catalyst for the composition.

2. The composition according to claim 1, wherein polymer (A) has the general formula (1):

$$X^1\text{-}A'\text{---}X^2 \qquad (1);$$

where $X^1$ and $X^2$ are independently selected from silicon containing groups which contain hydroxyl or hydrolysable substituents, and A' represents a polymer chain in which $X^1$ or $X^2$ groups incorporating hydroxyl and/or hydrolysable substituents is selected from the following groups: —Si(OH)$_3$, —(R$^a$)Si(OH)$_2$, (R$^a$)$_2$SiOH, —(R$^a$)Si(OR$^b$)$_2$, —Si(OR$^b$)$_3$, —(R$^a$)$_2$SiOR$^b$ or —(R$^a$)$_2$Si—R$^c$—SiR$^d_p$(OR$^b$)$_{3-p}$ where each R$^a$ independently represents a monovalent hydrocarbyl group;

each R$^b$ and R$^d$ is independently an alkyl or alkoxy group in which the alkyl groups have up to 6 carbon atoms;

R$^c$ is a divalent hydrocarbon group which contains between 1 and 10 carbon atoms which may be interrupted by one or more siloxane spacers having up to six silicon atoms; and p has the value 0, 1 or 2.

3. The composition according to claim 2, polymer (A) is a diorganopolysiloxane that comprises:

20 to 100 parts by weight of (A-1) a diorganopolysiloxane capped at both molecular terminals with alkoxysilyl groups or hydroxysilyl groups; and 0 to 80 parts by weight of (A-2) a diorganopolysiloxane capped at one molecular terminal with an alkoxysilyl group or a hydroxysilyl group and capped at the other molecular terminal with an alkyl group or an alkenyl group.

4. The composition according to claim 3, wherein (A-1) and (A-2) are present in a (A-1):(A-2) weight ratio of from 100:0 to 20:80.

5. The composition according to claim 3, wherein (A-1) and (A-2) are present in a (A-1):(A-2) weight ratio of from 100:0 to 60:40.

6. The composition according to claim 2, wherein polymer chain A' is a siloxane-containing polymer chain comprising siloxane units of the formula (2):

$$\text{---}(R^5_s SiO_{(4-s/2)})\text{---} \qquad (2);$$

where each $R^5$ is independently an organic group and s has, on average, a value of from 1 to 3.

7. The composition in accordance with claim 6, wherein:
i) each $R^5$ is independently a hydrocarbon group having from 1 to 18 carbon atoms, a substituted hydrocarbon group having from 1 to 18 carbon atoms or a hydrocarbonoxy group having up to 18 carbon atoms;
ii) s has, on average, a value of from 1.8 to 2.2; or
iii) both i) and ii).

8. The composition in accordance with claim 2, wherein each R$^a$ independently represents an alkyl group having from 1 to 8 carbon atoms, alternatively each R$^a$ is a methyl group.

9. The composition in accordance with claim 1, wherein the composition is a two part composition comprising:
I) a base composition comprising;
30 to 70 weight % of polymer (A), and
30 to 70 weight % of filler(s) (C), and
optionally one or more additives,
with the total % weight of the base composition being 100 weight %; and II) a cross-linking composition comprising;
crosslinking agent (B), and
silane (D) in a ratio of (B):(D) of between 1:9 and 9:1;
with the base composition and cross-linking composition being in a ratio of from 15:1 to 1:1.

10. The composition in accordance with claim 9, wherein the cross-linking composition further comprises:
(E) one or more polymers unreactive with components (B) and (D); and/or
(F) a pigment or coloured filler.

11. The composition in accordance with claim 10, wherein polymer(s) (E) is present, functions as a plasticiser or extender, and is selected from polydimethylsiloxanes having terminal triorganosiloxy groups or from organic polymers.

12. The composition in accordance with claim 11, wherein polymer(s) (E) is selected from mixtures of paraffinic and naphthenic hydrocarbons, paraffin oils comprising cyclic paraffins and non-cyclic paraffins and hydrocarbon fluids containing naphthenics, polycyclic naphthenics and paraffins.

13. The composition in accordance with claim 11, wherein polymer(s) (E) is selected from polydimethylsiloxanes having terminal triorganosiloxy groups and wherein the organic substituents of such groups are methyl, vinyl, phenyl, or combinations thereof.

14. The composition in accordance with claim 10, wherein the cross-linking composition comprises:
2 to 50 weight % of crosslinking agent (B);
silane (D);
5 to 30 weight % of polymer(s) (E); and
1 to 15 weight % of filler(s) (F).

15. The composition in accordance with claim 1, wherein silane (D) is selected from the group of Bis[3-trimethoxysilyl)propylamine, Bis[3-triethoxysilyl)propylamine, Bis[3-trimethoxysilyl)butylamine, Bis[3-triethoxysilyl)butylamine, and mixtures thereof.

16. The composition in accordance with claim 1 further comprising one or more additives selected from the group of plasticizers, extenders, rheology modifiers, adhesion promoters, pigments, heat stabilizers, flame retardants, UV stabilizers, chain extenders, cure modifiers, electrically conductive fillers, heat conductive fillers, fungicides, and/or biocides.

17. The composition according to claim 1, wherein the composition is a one part composition comprising:
30 to 70 weight % of polymer (A);
0.5 to 10 weight % of crosslinking agent (B);
30 to 70 weight % of filler(s) (C); and
silane (D);
with the total weight % of the composition being 100 weight %.

18. The composition according to claim 1, wherein crosslinking agent (B) comprises at least three groups reactive with the silicon-bonded hydroxyl or hydrolysable groups of polymer (A).

19. A coating, caulking, mold-making and/or encapsulating material comprising and/or formed from the composition in accordance with claim 1.

20. A method of forming an elastomeric mass between at least two surfaces, said method comprising the steps of:
introducing a mass of a moisture curable composition between the surfaces; and
allowing the composition to cure thereby adhering the surfaces;
wherein the composition is in accordance with claim 1.

* * * * *